United States Patent [19]

Mason et al.

[11] 4,011,560
[45] Mar. 8, 1977

[54] PROGRAMMABLE LIGHT DISPLAY SYSTEM

[75] Inventors: Harry Mason; Marcel C. Schiess, both of Albuquerque, N. Mex.

[73] Assignee: The United States of America as represented by the Secretary of the Air Force, Washington, D.C.

[22] Filed: Oct. 2, 1975

[21] Appl. No.: 619,112

[52] U.S. Cl. .................. 340/366 R; 340/381
[51] Int. Cl.² .......................................... G08B 5/36
[58] Field of Search ............ 40/130 L; 340/366 R, 340/381, 339

[56] References Cited

UNITED STATES PATENTS

| | | | |
|---|---|---|---|
| 2,596,166 | 5/1952 | Peterson | 40/130 L |
| 3,246,208 | 5/1966 | Lex | 40/130 L |
| 3,573,792 | 4/1971 | Reed | 40/130 L |
| 3,726,033 | 4/1973 | Benton | 40/130 L X |

*Primary Examiner*—Harold I. Pitts
*Attorney, Agent, or Firm*—Joseph E. Rusz; Jacob N. Erlich

[57] ABSTRACT

A programmable light display system having a carrying case, a semi-rigid, readily penetrable display board mounted in the carrying case and a quill and light assembly for use therewith. Any suitable map, chart or drawing is mounted on the display board and the quill and light assembly is inserted through both the board and map at a predetermined location. After connection of the quill to a printed circuit board connector the light presents an accurate visual display of events occurring at various locations.

7 Claims, 6 Drawing Figures

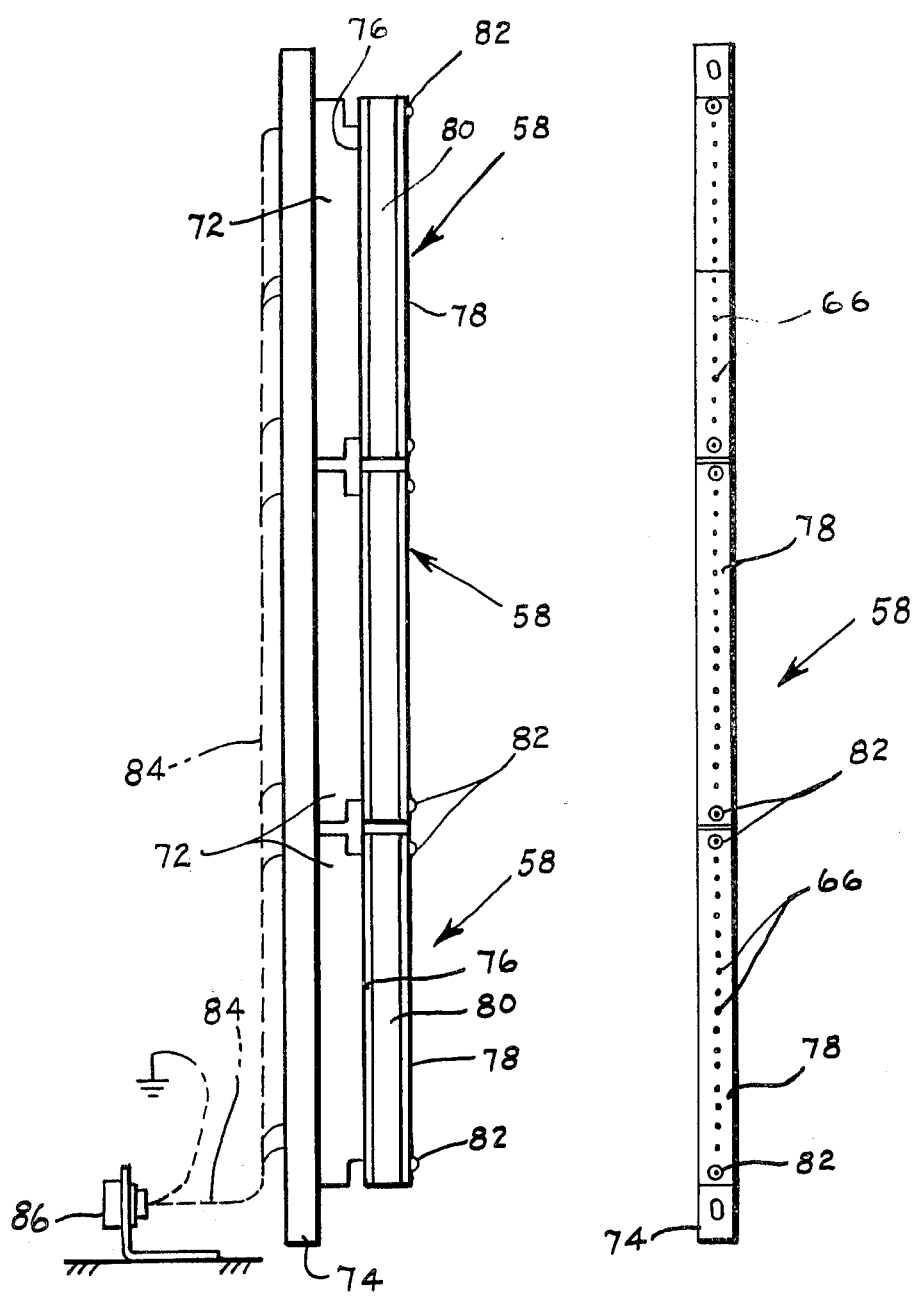

PROGRAMMABLE LIGHT DISPLAY SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates generally to visual displays, and, more particularly to a programmable light display system which can be used with a variety of available maps and charts.

The use of display systems, particularly large board display systems for providing visual indication of various situations and conditions, is increasing significantly in both military and non-military applications. Such display systems, when combined with control systems such as data processing systems, are suitable for communication network displays, production or processing control systems, air, ground or sea traffic control, etc.

The board display systems currently available include electroluminescent display panels with high density multicolored back lighted systems using magnetically operated shutters and flat sandwich gas discharge panels. Such display systems tend to be complex, fixed or inflexible and extremely expensive. For example, in the gas discharge panel a 10 inches square display may utilize 10,000 tiny neon gas cells, with every cell requiring an individual switching circuit. In addition, such display systems of the past fail to accommodate a wide variety of map scales or proportions and limit the positioning of lights to increments of grid spacing. Furthermore, in many instances it was necessary to use transparent or translucent charts or maps as overlays on the lighting matrix. Such high initial cost and continuing cost of overlay maps and charts rapidly led to the discontinued use of such board display systems.

SUMMARY OF THE INVENTION

The instant invention sets forth a programmable light display system which is capable of providing a visual display of events occurring at various locations within an area, space or structure as defined by a map, chart or drawing which may be of any scale or porportion to the area, space or structure compatible with visual representation. In so doing the instant invention eliminates the undesirable features and shortcomings of various other systems set forth hereinabove by:

1. Replacing the fixed grid or cellular light matrix of the past with a semi-rigid foam display board which can be penetrated easily at an infinite number of points by the quill of the display light and quill assembly of this invention;

2. Permitting the use of standard stock paper charts, maps and drawings of any scale or proportion in place of fixed scale or proportional overlay type charts and maps;

3. Directing and positioning the display lights on the front surface of the maps or charts;

4. Making readily accessible single connection programming; and

5. Reducing overall costs because of simplified design and elimination of the requirement for special charts and maps.

The programmable light display system of this invention is in the form of a semi-rigid but readily penetrated foam display board supported in a case and frame. Conventional maps or charts which are readily available can be taped or tacked on the front of the display board. A display light and quill assembly is inserted through the map and foam base board from the front thereof at the desirable data input location. The cable of the quill assembly is drawn through the board and map until the display light rests on the surface and the map or chart. The quill connector being subsequently inserted into an associated input jack on a connector assembly.

The front cover of the display system of the instant invention is made of clear plastic so as to not only protect the display surface and lights but to provide a transparent overlay system for notations using a conventional grease pencil which can be attached to the frame. In addition, the entire assembly can be easily carried by means of a foldable carrying handle provided in the top center of the frame.

It is therefore an object of this invention to provide a programmable light display system which is capable of operation with conventional and readily obtainable maps, charts and drawings.

It is a further object of this invention to provide a programmable light display system which is capable of being easily transported from one location to another.

It is another object of this invention to provide a programmable light display system which utilizes a single connection for the programming thereof.

It is still another object of this invention to provide a programmable light display system which is economical to produce and which utilizes conventional, currently available components that lend themselves to standard mass producing manufacturing techniques.

For a better understanding of the present invention together with other and further objects thereof, reference is made to the following description taken in conjunction with the accompanying drawing and its scope will be pointed out in the appended claims.

DESCRIPTION OF THE DRAWING

FIG. 4 is a side elevational view of the connector assembly of the programmable light display system of this invention with the masks and spacer being enlarged for clarity;

FIG. 5 is a front elevational view of the connector assembly utilized with the programmable light display system of this invention; and FIG. 5a is an enlarged view of a section of the connector assembly shown in FIG. 5 with special emphasis placed on the input jack holes.

DETAILED DESCRIPTION OF THE PREFERRED EMBODIMENT

Figure 1:
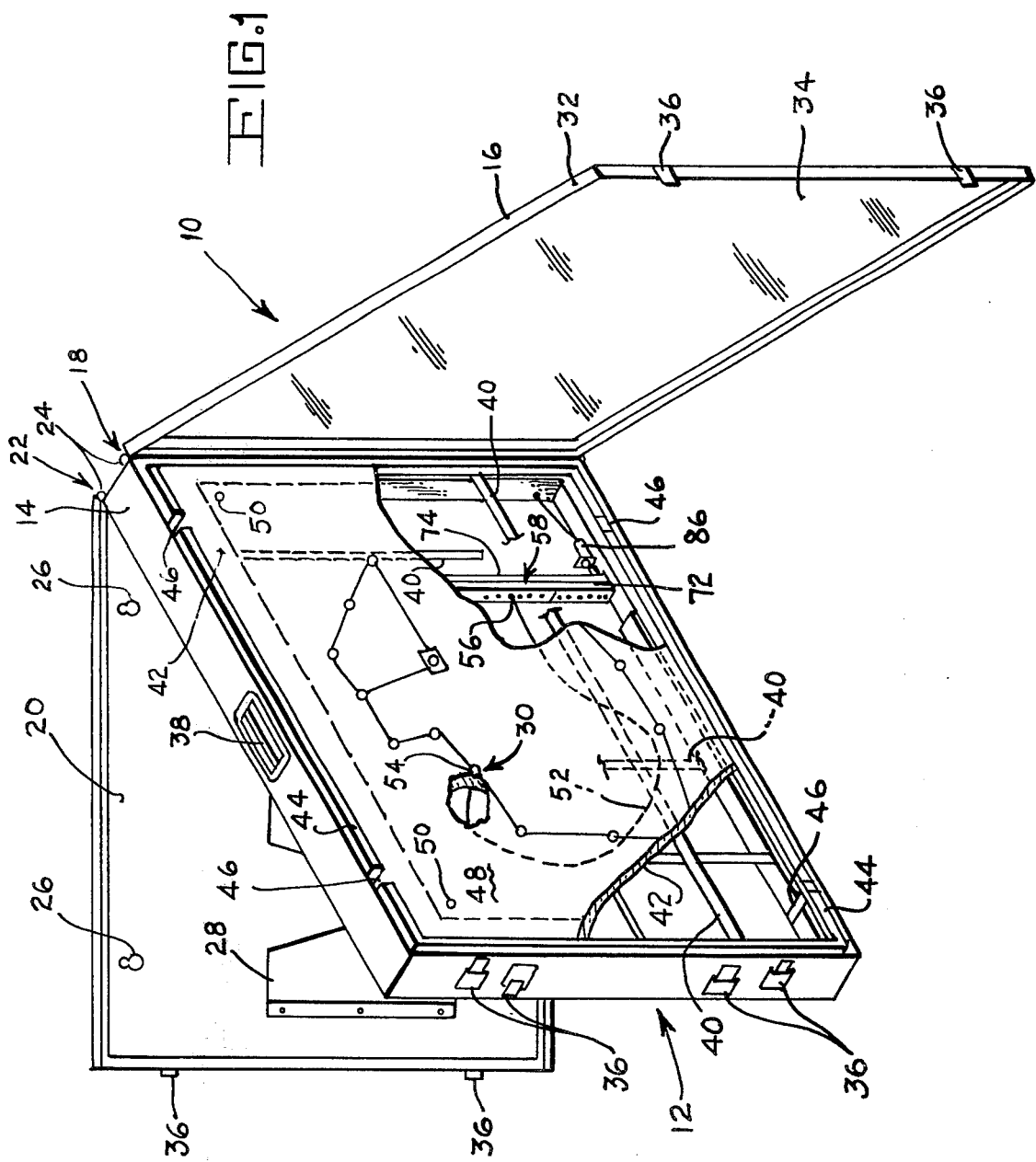
FIG. 1 is a pictorial representation of the programmable light display system of this invention.

Reference is made to FIG. 1 of the drawing which best shows the programmable light display system 10 of this invention. Display system 10 is made up of a portable carrying case 12 constructed of any suitable lightweight material such as wood, plastic or aluminum and takes the form of a substantially rectangular frame 14 having a front cover 16 pivotally secured thereto at 18 and a rear cover 20 pivotally secured thereto at 22. It should be noted, however, that the exact configuration thereof may vary within the scope of this invention. Any conventional hinge assembly 24, the details of which are not shown, can be used as the pivotal connections. Rear cover 20 has a plurality of apertures 26 therein for easy mounting of display system 10 and a storage pocket or receptacle 28 for holding maps, charts drawings and the like as well as the display light and quill assemblies 30 when not in use.

Front cover 16 is made of a rectangular shaped frame 52 of lightweight material. Frame 32 supports therein in spaced relationship to frame 14 any suitable transparent front surface 34 preferably made of plastic. Cover 16 not only protects the display surface and lights of system 10 but also provides a transparent overlay surface for notations. Any conventional grease pencil (not shown) can be attached in any suitable manner to carrying case frame 14 for easy accessability when notations are desired. Front and rear covers 16 and 20, respectively, are secured to frame 14 of carrying case 12 by a plurality of conventional suitcase-type latches 36. In addition a retractable carrying handle 38 is located within the top of frame 14 for easily transporting light display system 10 when desired.

Still referring to FIG. 1 of the drawing, display case frame 14 has mounted therein a plurality of rigid grid bars 40 which support a display board 42 to be described in detail hereinbelow. Display board 42 is fixedly secured within frame 14 against grid bars 40 by rectangular support bars 44 mounted within carrying case frame 14. Support bars 44 are held in position by any suitable removable securing means such as strips or clamps 46. Such a securing method allows for the easy replacement of board 42 if desired. Display board 42 is preferably made out of styrofoam but any semi-rigid, readily penetratable material which will allow insertion therethrough of light and quill assembly 30 in a manner to be described in detail hereinbelow will do. A map, chart or drawing 48 showing sensor or other data input locations is taped or tacked at 50 on the front of display board 42.

Figure 2:
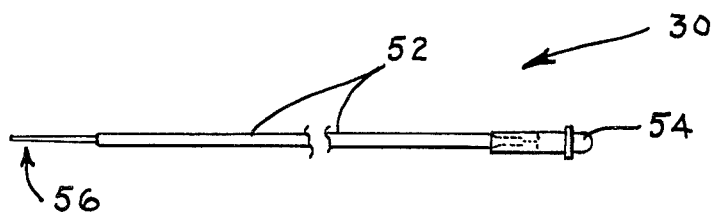
FIG. 2 is a segmented side elevational view of the light and quill assembly of the programmable light display system of this invention.
Figure 3:
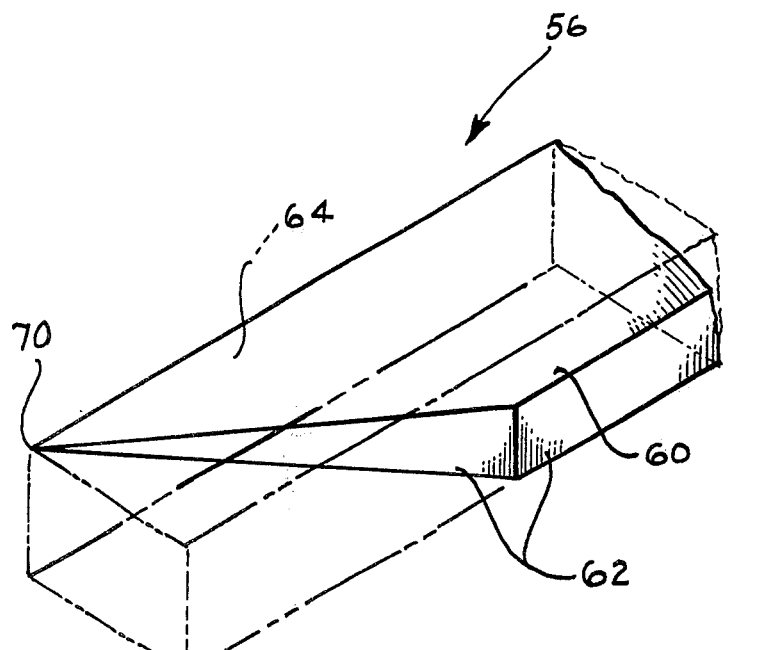
FIG. 3 is an enlarged view of the quill connector of the light and quill assembly shown in FIG. 2 of the drawing.

Reference is now made to FIGS. 1–3 in general and FIGS. 2 and 3 in particular in order to clearly show the display light and quill assembly 30 of this invention. Although only one such assembly 30 is shown in the drawing it is noted that any number of assemblies 30 may be used with this invention. Display light and quill assembly 30 is made of a flexible electrical cable 52 of sufficient length having any suitable light source 54 such as a light emitting diode (LED) at one end thereof and a penetrating quill 56 at the other end thereof. Quill 56 (shown in exaggerated fashion in FIG. 3) forms the electrical connection between light source 54 and connector assembly 58 which will be described in detail hereinbelow with respect to FIGS. 4, 5 and 5a. Quill 56 has one beveled edge 60 and two flat contact surfaces 62 and 64. The beveled edge 60 polarizes quill 56 permitting it to be inserted into a corresponding jack hole 66 of connector assembly 58 shown in FIG. 5a. This invention can only take place when beveled edge 60 is oriented to match the inverted V side 68 of jack hole 66.

An additional limitation to the quill design of FIG. 3 is that the beveled edge 60 and flat contact surfaces 62 and 64 come to a point thereby forming a sharp tip 70. This sharp tip 70 facilitates the penetration of quill 56 through map or chart 48 and through display board 42. Subsequently the entire cable 52 of quill 56 and light assembly 30 can be pulled through board 42. The polarized quill 56 and jack hole 66 are necessary to provide operating current of the right polarity to display light source 54. The precise shape, however, of quill 56, although preferably as shown in the drawing, can be altered as long as the above criteria of this invention are still met.

Reference is now made to FIGS. 4, 5 and 5a of the drawing which clearly show connector assembly 58. Assembly 58 utilizes a conventional edge type printed circuit board connector 72 mounted upon a support member 74 within frame 14 of carrying case 12. Connector 72 contacts both conducting surfaces 62 and 64 of quill 56 thereby providing the desired electrical connection between connector 72 and light source 54. Two masks 76 and 78, respectively, having polarized jack holes 66 therein and a spacer 80 are mounted by any conventional securing means such as bolts 82 to the front of printed circuit board connector 72 to support the inserted quill 56, position it between the proper pair of contacts, and assure proper polarity. Outer mask 78 has identification numbers and programming symbols associated with each polarized jack hole 66. The entire connector 58 is electrically connected by any suitable electrical connection such as wires 84 to an input receiver 86 which can be connected to any conventional programmable power source (not shown).

The instant invention provides a portable, easily programmed display system 10 which is capable of operation with a plurality of maps, charts, drawings 48 and the like. Any number of quill and light asemblies 30 may be utilized with printed circuit board connector 58 so as to present an accurate visual display of events occurring at various locations on the map 48.

Although this invention has been described with reference to a particular embodiment it will be understood to those skilled in the art that this invention is also capable of a variety of alternate embodiments within the spirit and scope of the appended claims.

We claim:

1. A programmable light display system comprising a support, a semi-rigid, readily penetrable display board mounted upon said support, a flexible cable, a light emitting source operably connected to one end of said cable and an electrical connector operably connected to the other end of said cable, said connector being designed for easy insertion through said display board, means for providing an electrical signal, said connector being capable of being electrically connected to said electrical signal providing means in only a predetermined position, whereby upon the connection of said connector to said electrical signal providing means said light display system is capable of presenting an accurate, visual display of events occurring at various locations.

2. A programmable light display system as defined in claim 1 wherein said electrical connector is in the form of a quill having a beveled edge and a pair of flat contact surfaces for matingly engaging said means for providing an electrical signal.

3. A programmable light display system as defined in claim 2 wherein said support comprises a frame, a plurality of grid bars mounted within said frame, a back cover pivotally secured to said frame and a front cover pivotally secured to said frame, said display board being mounted against said grid bars and means connected to said frame for removably securing said display board against said grid bars.

4. A programmable light display system as defined in claim 3 wherein said front cover is made of a transparent material.

5. A programmable light display system as defined in claim 4 wherein said means for providing an electrical signal is in the form of a printed circuit board, said printed circuit board having a plurality of jack holes therein for matingly engaging said quill connector.

6. A programmable light display system as defined in claim 5 wherein said light source is in the form of a light emitting diode.

7. A programmable light display system as defined in claim 6 wherein said support further comprises a carrying handle secured to said frame.

* * * * *